US012361095B2

(12) United States Patent
Ghanta et al.

(10) Patent No.: US 12,361,095 B2
(45) Date of Patent: Jul. 15, 2025

(54) DETECTING SUITABILITY OF MACHINE LEARNING MODELS FOR DATASETS

(71) Applicant: DataRobot, Inc., Boston, MA (US)

(72) Inventors: Sindhu Ghanta, San Mateo, CA (US); Bharath Ramsundar, Fremont, CA (US); Drew Roselli, Woodinville, WA (US); Nisha Talagala, Saratoga, CA (US); Vinay Sridhar, San Jose, CA (US); Swaminathan Sundararaman, San Jose, CA (US); Lior Amar, Sunnyvale, CA (US); Lior Khermosh, Palo Alto, CA (US); Sriram Subramanian, Dallas, TX (US)

(73) Assignee: DataRobot, Inc., Boston, MA (US)

( * ) Notice: Subject to any disclaimer, the term of this patent is extended or adjusted under 35 U.S.C. 154(b) by 0 days.

(21) Appl. No.: 17/991,274

(22) Filed: Nov. 21, 2022

(65) Prior Publication Data
US 2023/0161843 A1 May 25, 2023

Related U.S. Application Data

(63) Continuation of application No. 16/001,904, filed on Jun. 6, 2018, now abandoned.

(51) Int. Cl.
G06Q 30/00 (2023.01)
G06F 17/18 (2006.01)
(Continued)

(52) U.S. Cl.
CPC ............ *G06F 18/217* (2023.01); *G06F 17/18* (2013.01); *G06F 18/2155* (2023.01);
(Continued)

(58) Field of Classification Search
None
See application file for complete search history.

(56) References Cited

U.S. PATENT DOCUMENTS

2006/0136205 A1* 6/2006 Song .................... G10L 15/063
704/243
2013/0103713 A1 4/2013 Woodruff
(Continued)

FOREIGN PATENT DOCUMENTS

EP 3101599 A2 12/2016
JP 2005081228 A 3/2005
(Continued)

OTHER PUBLICATIONS

Membership Inference Attacks Against Machine Learning Models. Author: Shokri, Reza, et. al., Publication info: Proceedings—IEEE Symposium on Security and Privacy : 3-18. Institute of Electrical and Electronics Engineers Inc. (Jun. 23, 2017) (Year: 2017).*

(Continued)

*Primary Examiner* — Matthew T Sittner
(74) *Attorney, Agent, or Firm* — Greenberg Traurig, LLP; Andrew J. Tibbetts; Samuel S. Stone

(57) ABSTRACT

Apparatuses, systems, program products, and method are disclosed for detecting suitability of machine learning models for datasets. An apparatus includes a training evaluation module configured to calculate a first statistical data signature for a training data set of a machine learning system using one or more predefined statistical algorithms. An apparatus includes an inference evaluation module configured to calculate a second statistical data signature for an inference data set of a machine learning system using one or more predefined statistical algorithms. An apparatus includes a score module configured to calculate a suitability score describing the suitability of a training data set to an inference data set as a function of a first and a second
(Continued)

statistical data signature. An apparatus includes an action module configured to perform an action related to a machine learning system in response to a suitability score satisfying an unsuitability threshold.

26 Claims, 9 Drawing Sheets

(51) Int. Cl.
*G06F 18/21* (2023.01)
*G06F 18/214* (2023.01)
*G06N 5/04* (2023.01)
*G06N 20/00* (2019.01)

(52) U.S. Cl.
CPC ........... *G06F 18/2193* (2023.01); *G06N 5/04* (2013.01); *G06N 20/00* (2019.01)

(56) References Cited

U.S. PATENT DOCUMENTS

| | | | |
|---|---|---|---|
| 2015/0157274 A1* | 6/2015 | Ghassemzadeh .... | A61B 5/7275 600/595 |
| 2015/0339572 A1 | 11/2015 | Achin | |
| 2016/0267525 A1* | 9/2016 | Lin .................... | G06Q 30/0246 |
| 2016/0300144 A1* | 10/2016 | Santhanam ............ | G06N 20/00 |
| 2016/0314123 A1* | 10/2016 | Ramachandran ........................... | G06F 16/24578 |
| 2016/0358088 A1 | 12/2016 | Lemmer et al. | |
| 2017/0149813 A1* | 5/2017 | Wright ................ | H04L 63/1416 |
| 2017/0161640 A1* | 6/2017 | Shamir .................. | G06N 20/00 |
| 2017/0236060 A1 | 8/2017 | Ignatyev | |
| 2017/0300814 A1 | 10/2017 | Shaked | |
| 2017/0372232 A1* | 12/2017 | Maughan .............. | G06F 3/0482 |
| 2018/0114142 A1 | 4/2018 | Mueller | |
| 2018/0181901 A1* | 6/2018 | Babcock ............... | G06F 3/0484 |
| 2018/0307576 A1 | 10/2018 | Debnath | |
| 2018/0365557 A1 | 12/2018 | Kobayashi | |
| 2019/0007508 A1* | 1/2019 | Xu ........................ | H04L 67/535 |
| 2019/0043380 A1 | 2/2019 | Clarke, IV | |
| 2019/0087821 A1 | 3/2019 | Jia | |
| 2019/0188602 A1 | 6/2019 | Kwant et al. | |
| 2019/0354895 A1 | 11/2019 | Vasudevan | |
| 2019/0377984 A1 | 12/2019 | Ghanta | |
| 2020/0034665 A1 | 1/2020 | Ghanta | |
| 2020/0082296 A1 | 3/2020 | Fly | |
| 2020/0151619 A1 | 5/2020 | Mopur | |
| 2020/0272915 A1 | 8/2020 | Tata | |
| 2020/0311616 A1 | 10/2020 | Rajkumar et al. | |
| 2021/0133632 A1 | 5/2021 | Elprin | |
| 2021/0224696 A1 | 7/2021 | Nasr-Azadani | |
| 2021/0390455 A1 | 12/2021 | Schierz | |
| 2023/0196101 A1 | 6/2023 | Ghanta | |
| 2024/0394595 A1 | 11/2024 | Schierz | |

FOREIGN PATENT DOCUMENTS

| | | |
|---|---|---|
| JP | 2017520068 A | 7/2017 |
| JP | 2017228068 A | 12/2017 |
| JP | 2019-159538 A | 9/2019 |
| JP | 2019204458 A | 11/2019 |
| WO | 2016152053 A1 | 9/2016 |
| WO | WO-2019/180778 A1 | 9/2019 |

OTHER PUBLICATIONS

Privacy-preserving personal model training. Author: Servia-Rodriguez, Sandra, et. al., Publication info: Proceedings—ACM/IEEE International Conference on Internet of Things Design and Implementation, IoTDI 2018 : 153-164. Institute of Electrical and Electronics Engineers Inc. (May 25, 2018) (Year: 2018).*
Neural Networks for Astronomical Data Analysis and Bayesian Inference. Author: Graff, Philip, et al., Publication info: 2013 IEEE 13th International Conference on Data Mining Workshops (ICDM) : 16-23;lix+596. IEEE Computer Society. (2013) (Year: 2013).*
Examination Report on EP Appl. Ser. No. 19733619.1 dated Feb. 15, 2023 (6 pages).
International Preliminary Report on Patentability on PCT Appl. Ser. No. PCT/US2019/035853 dated Dec. 8, 2020 (7 pages).
International Search Report and Written Opinion on PCT Appl. Ser. No. PCT/US2019/035853 dated Sep. 20, 2019 (9 pages).
Non-Final Office Action on U.S. Appl. No. 16/001,904 dated Jun. 3, 2022 (26 pages).
Office Action on JP Appl. Ser. No. 2021-518048 dated Jun. 20, 2023 (10 pages).
U.S. Appl. No. 16/001,904, filed Jun. 6, 2018, Ghanta et al.
U.S. Appl. No. 16/049,647, filed Jul. 30, 2018, Ghanta et al.
U.S. Appl. No. 17/988,725, filed Nov. 16, 2022, Ghanta et al.
U.S. Appl. No. 17/344,252, filed Jun. 10, 2021, Schierz et al.
U.S. Appl. No. 18/582,380, filed Feb. 20, 2024, Schierz et al.
Baier et al., "Handling Concept Drifts in Regression Problems—the Error Intersection Approach," Jan. 2020, In Proceedings of 15th International Conference on Wirtschaftsinformatik, 15 Pages (Year: 2020).
Bi, Jinbo et al., "Regression Error Characteristic Curves", Proceedings of the 20th International Conference on Machine Learning, 2003, 8 pages.
Final Office Action from U.S. Appl. No. 17/344,252, dated Feb. 11, 2022, 24 pp.
Final Office Action from U.S. Appl. No. 17/344,252, dated Mar. 9, 2023, 24 pp.
Final Office Action from U.S. Appl. No. 17/344,252, dated Oct. 20, 2023, 31 pp.
International Preliminary Report on Patentability on PCT Appl. Ser. No. PCT/US2019/044250 dated Feb. 2, 2021 (9 pages).
International Preliminary Report on Patentability on PCT Appl. Ser. No. PCT/US2021/036767 dated Dec. 22, 2022 (9 pages).
International Search Report & Written Opinion on PCT Appl. Ser. No. PCT/US2019/044250 dated Dec. 6, 2019 (11 pages).
International Search Report and Written Opinion on PCT Appl. Ser. No. PCT/US2021/036767 dated Sep. 21, 2021 (18 pages).
Non-final Office Action from U.S. Appl. No. 16/049,647, dated Jun. 6, 2022, 32 pp.
Non-final Office Action from U.S. Appl. No. 17/344,252, dated Jul. 17, 2023, 24 pp.
Non-final Office Action from U.S. Appl. No. 17/344,252, dated Oct. 13, 2022, 29 pp.
Non-final Office Action from U.S. Appl. No. 17/344,252, dated Oct. 29, 2021, 22 pp.
Non-final Office Action from U.S. Appl. No. 17/988,725, dated Sep. 29, 2023, 26 pp.
Office Action from EP application No. 19752816.9, dated Aug. 1, 2023, 4 pp.
Office Action from JP application No. 2021-505276, dated Jul. 21, 2023, 4 pp.
Webb et al., "Analyzing concept drift and shift from sample data", Data Mining and Knowledge Discovery (2018) 32: 1179-1199 (Year: 2018).
Wikipedia, "Confusion matrix", https://en.wikipedia.org/wiki/Confusion_matrix, Retrieved Jul. 10, 2018.
Written Opinion and Invitation to Respond on SG Appl. Ser. No. 11202100975P dated Oct. 24, 2022 (8 pages).
Office Action in corresponding Korean Patent Application No. 10-2021-7000062, mailed May 22, 2025 (12 Pages).

* cited by examiner

DETECTING SUITABILITY OF MACHINE LEARNING MODELS FOR DATASETS

CROSS-REFERENCE TO RELATED PATENT APPLICATIONS

This application claims the benefit of priority under 35 U.S.C. § 120 as a continuation of U.S. patent application Ser. No. 16/001,904, filed Jun. 6, 2018, the contents of such application being hereby incorporated by reference in its entirety and for all purposes as if completely and fully set forth herein.

FIELD

This invention relates to machine learning and more particularly relates to monitoring the suitability of a machine learning model, trained using a training data set, for an inference data set.

BACKGROUND

Machine learning is being integrated into a wide range of use cases and industries. Unlike other types of applications, machine learning (including deep learning and advanced analytics) has multiple independent running components that must operate cohesively to deliver accurate and relevant results. This inherent complexity makes it difficult to manage or monitor all the interdependent aspects of a machine learning system.

SUMMARY

Apparatuses, systems, program products, and method are disclosed for detecting suitability of machine learning models for datasets. In one embodiment, an apparatus includes a training evaluation module configured to calculate a first statistical data signature for a training data set of a machine learning system using one or more predefined statistical algorithms. The training data set may be used to generate a machine learning model. An apparatus, in certain embodiments, includes an inference evaluation module configured to calculate a second statistical data signature for an inference data set of a machine learning system using one or more predefined statistical algorithms. The inference data set may be analyzed using a machine learning model. An apparatus, in some embodiments, includes a score module configured to calculate a suitability score describing the suitability of a training data set to an inference data set as a function of a first and a second statistical data signature. In one embodiment, an apparatus includes an action module configured to perform an action related to a machine learning system in response to a suitability score satisfying an unsuitability threshold.

A method for detecting suitability of machine learning models for datasets, in one embodiment, includes calculating a first statistical data signature for a training data set of a machine learning system using one or more predefined statistical algorithms. The training data set may be used to generate a machine learning model. A method, in certain embodiments, includes calculating a second statistical data signature for an inference data set of a machine learning system using one or more predefined statistical algorithms. The inference data set may be analyzed using a machine learning model. A method, in some embodiments, includes calculating a suitability score describing the suitability of a training data set to an inference data set as a function of a first and a second statistical data signature. In one embodiment, a method includes performing an action related to a machine learning system in response to a suitability score satisfying an unsuitability threshold.

In one embodiment, an apparatus for detecting suitability of machine learning models for datasets includes means for calculating a first statistical data signature for a training data set of a machine learning system using one or more predefined statistical algorithms. The training data set may be used to generate a machine learning model. An apparatus, in certain embodiments, includes means for calculating a second statistical data signature for an inference data set of a machine learning system using one or more predefined statistical algorithms. The inference data set may be analyzed using a machine learning model. An apparatus, in some embodiments, includes means for calculating a suitability score describing the suitability of a training data set to an inference data set as a function of a first and a second statistical data signature. In one embodiment, an apparatus includes means for performing an action related to a machine learning system in response to a suitability score satisfying an unsuitability threshold.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
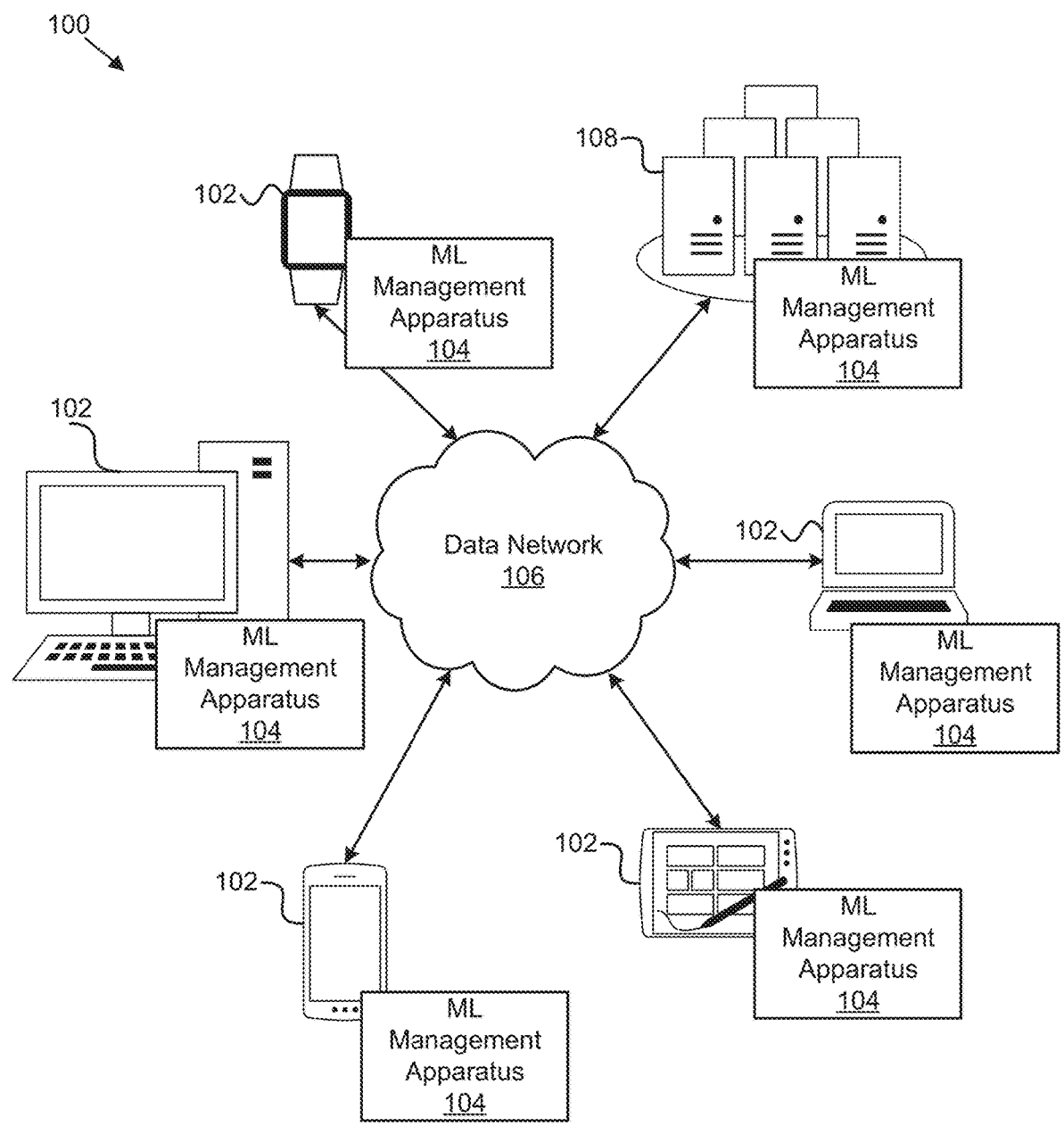
FIG. 1 is a schematic block diagram illustrating one embodiment of a system for detecting suitability of machine learning models for datasets.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 is a schematic block diagram illustrating one embodiment of a system 100 for detecting suitability of machine learning models for datasets. In one embodiment, the system 100 includes one or more information handling devices 102, one or more ML management apparatuses 104, one or more data networks 106, and one or more servers 108. In certain embodiments, even though a specific number of information handling devices 102, ML management apparatuses 104, data networks 106, and servers 108 are depicted in FIG. 1, one of skill in the art will recognize, in light of this disclosure, that any number of information handling devices 102, ML management apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may include executable code, functions, instructions, operating systems, and/or the like for performing various machine learning operations, as described in more detail below.

In one embodiment, the ML management apparatus 104 is configured to manage, monitor, maintain, and/or the like the "health" of a machine learning system. As used herein, the "health" of a machine learning system may refer to the suitability of a machine learning model that is trained on a training data set for an inference data set that is processed using the machine learning model based on a statistical analysis of the training data set and the inference data set. As explained in more detail below, a machine learning system may involve various components, pipelines, data sets, and/or the like-such as training pipelines, orchestration/management pipelines, inference pipelines, and/or the like. Furthermore, components may be specially designed or configured to handle specific objectives, problems, and/or the like. In conventional machine learning systems, a user may be required to determine which machine learning components are necessary to analyze a particular problem/objective, and then manually determine the inputs/outputs for each of the components, the limitations of each component, events generated by each component, and/or the like. Furthermore, with conventional machine learning systems, it may be difficult to track down where an error occurred, what caused an error, why the predicted results weren't as accurate as they should be, whether the machine learning model is suitable for a particular inference data set, and/or the like, due to the numerous components and interactions within the system.

In one embodiment, the ML management apparatus 104 improves upon conventional machine learning systems by calculating a statistical data signature for a training data set and an inference data set of a machine learning system, calculating a health/suitability score as a function of the statistical data signatures, and performing an action related to the machine learning system if the health/suitability score does not satisfy a suitability threshold or satisfies an unsuitability threshold. For instance, if the health/suitability score satisfies an unsuitability threshold, indicating that the training data set, and the machine learning model used to analyze the inference data set, is not suitable for the inference training data, the ML management apparatus 104 may change the machine learning model, may retrain the machine learning model, may provide recommendations for generating a more accurate machine learning model, and/or the like.

Furthermore, the ML management apparatus 104 may determine the suitability of a machine learning model trained using a training data set to an inference data set at any point in the machine learning system. For example, if the machine learning system is a deep learning system that includes multiple inference layers, the ML management apparatus 104 may determine how suitable a training data set and/or the machine learning model is to the inference data set processed at each layer of the deep learning system.

In certain embodiments of machine learning systems 200, there is a training phase, for generating the machine learning model, and an inference phase for analyzing an inference data set using the machine learning model. The output from the inference phase may be one or more predictive "labels" determined as a function of one or more features of the inference data set. For example, if the training data set comprises three columns of feature data—Age, Sex, and Height—that are used to train the machine learning model, and the inference data comprises two columns of feature data-Age and Height—the output from an inference pipeline 206 using the machine learning model may be a "label" describing the predicted Sex (M/F) based on the given inference data.

In such an embodiment, labels may be required to determine the suitability of the machine learning model, e.g., the accuracy or predictive performance of the machine learning model, to an inference data set during the inference phase. The predictive performance is usually evaluated on either the training data set or a separate validation or test set where both the feature and label information is available, which does not allow for determining or estimating the predictive performance of the machine learning model is real-time during or prior to the inference phase. Furthermore, waiting for labels to be generated may delay the analysis, which can cause business loses or other issue when the predictive performance of the machine learning model deviates or drops.

The ML management apparatus 104, in one embodiment, however, evaluates the suitability (predictive performance) of an machine learning model, machine learning algorithm, and/or the like in the absence of labels, and is agnostic of the type of problem and algorithm used, the particular language or framework used, and/or the like by extracting statistics from features in the training data set and the inference data set, and using the statistics to evaluate how applicable the training data set is likely to be to the inference data set by generating a suitability score, as explained in more detail below.

The ML management apparatus 104, including its various sub-modules, may be located on one or more information handling devices 102 in the system 100, one or more servers 108, one or more network devices, and/or the like. The ML management apparatus 104 is described in more detail below with reference to FIG. 3.

In various embodiments, the ML management apparatus 104 may be embodied as a hardware appliance that can be installed or deployed on an information handling device 102, on a server 108, or elsewhere on the data network 106. In certain embodiments, the ML management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the ML management apparatus 104 may include a power interface, a wired and/or wireless network interface, a graphical interface that attaches to a display, and/or a semiconductor integrated circuit device as described below, configured to perform the functions described herein with regard to the ML management apparatus 104.

The ML management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like.

In one embodiment, the ML management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the ML management apparatus 104.

The semiconductor integrated circuit device or other hardware appliance of the ML management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the ML management apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The one or more servers 108 may store data associated with an information handling device 102, such as machine learning data, algorithms, training models, and/or the like.

Figure 2A:
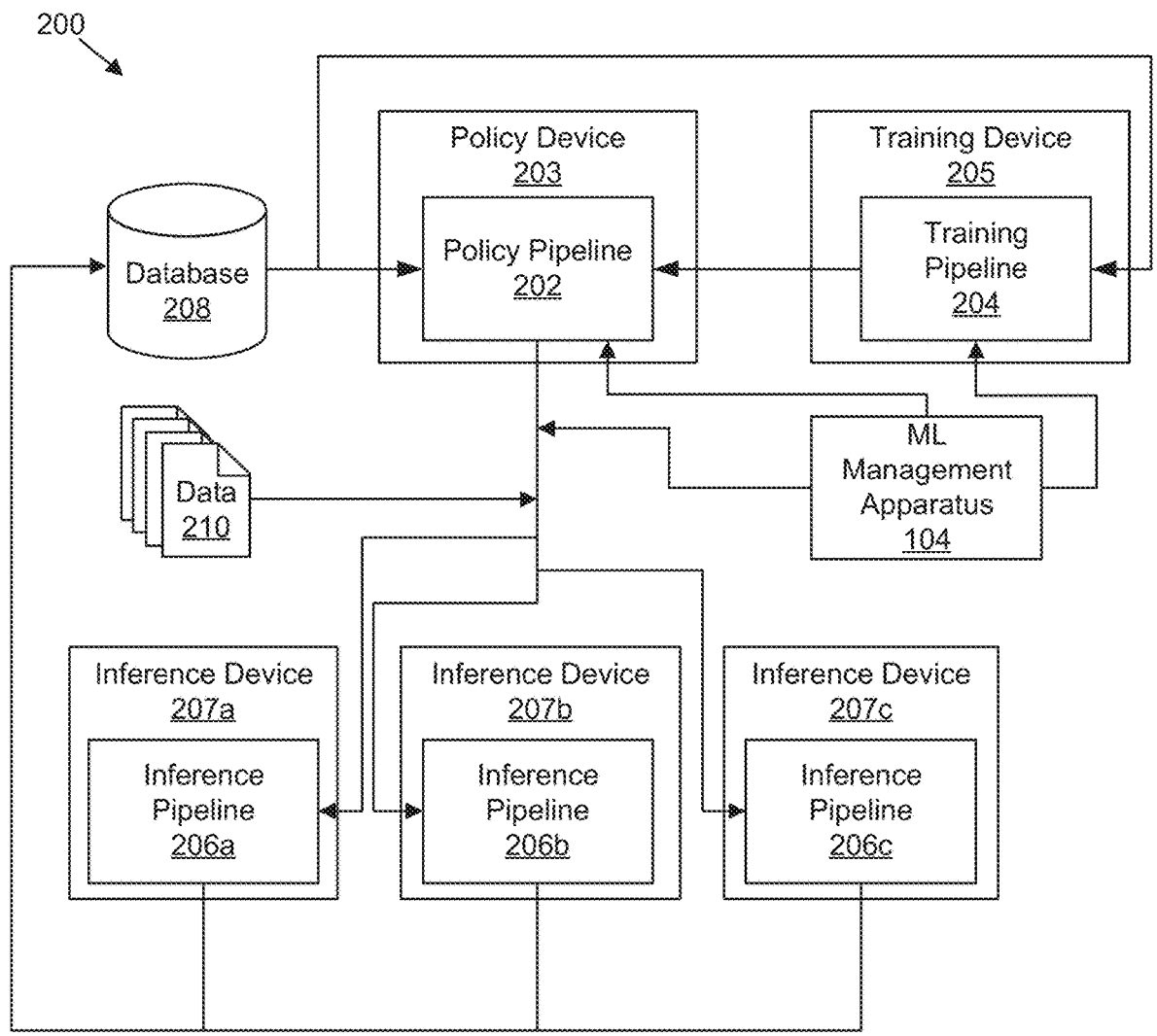
FIG. 2A is a schematic block diagram illustrating one embodiment of a logical machine learning layer for detecting suitability of machine learning models for datasets.

FIG. 2A is a schematic block diagram illustrating one embodiment of a machine learning system 200 for detecting suitability of machine learning models for datasets. In one embodiment, the logical machine learning layer 200 includes one or more policy/control pipelines 202, one or more training pipelines 204, one or more inference pipelines 206a-c, one or more databases 208, input data 210, and an ML management apparatus 104. Even though a specific number of machine learning pipelines 202, 204, 206a-c are depicted in FIG. 2A, one of skill in the art, in light of this disclosure, will recognize that any number of machine learning pipelines 202, 204, 206a-c may be present in the logical machine learning layer 200. Furthermore, as depicted in FIG. 2A, the various pipelines 202, 204, 206a-c may be located on different nodes embodied as devices 203, 205, 207a-c such as information handling devices 102 described above, virtual machines, cloud or other remote devices, and/or the like. In some embodiments, the machine learning system 200 includes an embodiment of a logical machine learning layer, also known as an intelligence overlay network ("ION").

As used herein, machine learning pipelines 202, 204, 206a-c comprise various machine learning features, components, objects, modules, and/or the like to perform various machine learning operations such as algorithm training/inference, feature engineering, validations, scoring, and/or the like. Pipelines 202, 204, 206a-c may analyze or process data 210 in batch, e.g., process all the data at once from a static source, streaming, e.g., operate incrementally on live data, or a combination of the foregoing, e.g., a micro-batch.

In certain embodiments, each pipeline 202, 204, 206a-c executes on a device 203, 205, 207a-c, e.g., an information handling device 102, a virtual machine, and/or the like. In some embodiments, multiple different pipelines 202, 204, 206a-c execute on the same device. In various embodiments, each pipeline 202, 204, 206a-c executes on a distinct or separate device. The devices 203, 205, 207a-c may all be located at a single location, may be connected to the same network, may be located in the cloud or another remote location, and/or some combination of the foregoing.

In one embodiment, each pipeline 202, 204, 206a-c is associated with an analytic engine and executes on a specific analytic engine type for which the pipeline is 202, 204, 206a-c configured. As used herein, an analytic engine comprises the instructions, code, functions, libraries, and/or the like for performing machine learning numeric computation and analysis. Examples of analytic engines may include Spark, Flink, TensorFlow, Caffe, Theano, and PyTorch. Pipelines 202, 204, 206a-c developed for these engines may contain components provided in modules/libraries for the particular analytic engine (e.g., Spark-ML/MLlib for Spark, Flink-ML for Flink, and/or the like). Custom programs may also be included that are developed for each analytic engine using the application programming interface for the analytic engine (e.g., DataSet/DataStream for Flink). Furthermore, each pipeline may be implemented using various different platforms, libraries, programming languages, and/or the like. For instance, an inference pipeline 206a may be implemented using Python, while a different inference pipeline 206b is implemented using Java.

In one embodiment, the machine learning system 200 includes physical and/or logical groupings of the machine learning pipelines 202, 204, 206a-c based on a desired objective, result, problem, and/or the like. For instance, the ML management apparatus 104 may select a training pipeline 204 for generating a machine learning model configured for the desired objective and one or more inference pipelines 206a-c that are configured to analyze the desired objective by processing input data 210 associated with the desired objective using the analytic engines for which the selected inference pipelines 206a-c are configured for and the machine learning model. Thus, groups may comprise multiple analytic engines, and analytic engines may be part of multiple groups. Groups can be defined to perform different tasks such as analyzing data for an objective, managing the operation of other groups, monitoring the results/performance of other groups, experimenting with different machine learning algorithms/models in a controlled environment, e.g., sandboxing, and/or the like.

For example, a logical grouping of machine learning pipelines 202, 204, 206a-c may be constructed to analyze the results, performance, operation, health, and/or the like of a different logical grouping of machine learning pipelines 202, 204, 206a-c by processing feedback, results, messages, and/or the like from the monitored logical grouping of machine learning pipelines 202, 204, 206a-c and/or by providing inputs into the monitored logical grouping of machine learning pipelines 202, 204, 206a-c to detect anomalies, errors, and/or the like.

Because the machine learning pipelines 202, 204, 206a-c may be located on different devices 203, 205, 207a-c, the same devices 203, 205, 207a-c, and/or the like, the ML management apparatus 104 logically groups machine learning pipelines 202, 204, 206a-c that are best configured for analyzing the objective. As described in more detail below, the logical grouping may be predefined such that a logical group of machine learning pipelines 202, 204, 206a-c may be particularly configured for a specific objective.

In certain embodiments, the ML management apparatus 104 dynamically selects machine learning pipelines 202, 204, 206a-c for an objective when the objective is determined, received, and/or the like based on the characteristics, settings, and/or the like of the machine learning pipelines 202, 204, 206a-c. In certain embodiments, the multiple different logical groupings of pipelines 202, 204, 206a-c may share the same physical infrastructure, platforms, devices, virtual machines, and/or the like. Furthermore, the different logical groupings of pipelines 202, 204, 206a-c may be merged, combined, and/or the like based on the objective being analyzed.

In one embodiment, the policy pipeline 202 is configured to maintain/manage the operations within the logical machine learning layer 200. In certain embodiments, for instance, the policy pipeline 202 receives machine learning models from the training pipeline 204 and pushes the machine learning models to the inference pipelines 206a-c for use in analyzing the input data 210 for the objective. In various embodiments, the policy pipeline 202 receives user input associated with the logical machine learning layer 200, receives event and/or feedback information from the other pipelines 204, 206a-c, validates machine learning models, facilitates data transmissions between the pipelines 202, 204, 206a-c, and/or the like.

In one embodiment, the policy pipeline 202 comprises one or more policies that define how pipelines 204, 206a-c interact with one another. For example, the training pipeline 204 may output a machine learning model after a training cycle has completed. Several possible policies may define how the machine learning model is handled. For example, a policy may specify that the machine learning model can be automatically pushed to inference pipelines 206a-c while another policy may specify that user input is required to approve a machine learning model prior to the policy pipeline 202 pushing the machine learning model to the inference pipelines 206a-c. Policies may further define how machine learning models are updated.

For instance, a policy may specify that a machine learning model be updated automatically based on feedback, e.g., based machine learning results received from an inference pipeline 206a-c; a policy may specify whether a user is required to review, verify, and/or validate a machine learning model before it is propagated to inference pipelines 206a-c; a policy may specify scheduling information within the logical machine learning layer 200 such as how often a machine learning model is update (e.g., once a day, once an hour, continuously, and/or the like); and/or the like.

Policies may define how different logical groups of pipelines 202, 204, 206a-c interact or cooperate to for a cohesive data intelligence workflow. For instance, a policy may specify that the results generated by one logical machine learning layer 200 be used as input into a different logical machine learning layer 200, e.g., as training data for a machine learning model, as input data 210 to an inference pipeline 206a-c, and/or the like. Policies may define how and when machine learning models are updated, how individual pipelines 202, 204, 206a-c communicate and interact, and/or the like.

In one embodiment, the policy pipeline 202 maintains a mapping of the pipelines 204, 206a-c that comprise the logical grouping of pipelines 204, 206a-c. The policy pipeline may further adjust various settings or features of the pipelines 204, 206a-c in response to user input, feedback or events generated by the pipelines 204, 206a-c, and/or the like. For example, if an inference pipeline 206a generates machine learning results that are inaccurate, the policy pipeline 202 may receive a message from the inference pipeline 202 that indicates the results are inaccurate, and may direct the training pipeline 204 to generate a new machine learning model for the inference pipeline 206a.

The training pipeline 204, in one embodiment, is configured to generate a machine learning model for the objective that is being analyzed based on historical or training data that is associated with the objective. As used herein, a machine learning model is generated by executing a training or learning algorithm on historical or training data associated with a particular objective. The machine learning model is the artifact that is generated by the training process, which captures patterns within the training data that map the input data to the target, e.g., the desired result/prediction. In one embodiment, the training data may be a static data set, data accessible from an online source, a streaming data set, and/or the like.

The inference pipelines 206a-c, in one embodiment, use the generated machine learning model and the corresponding analytics engine to generate machine learning results/predictions on input/inference data 210 that is associated with the objective. The input data may comprise data associated with the objective that is being analyzed, but was not part of the training data, e.g., the patterns/outcomes of the input data are not known. For example, if a user wants to know whether an email is spam, the training pipeline 204 may generate a machine learning model using a training data set that includes emails that are known to be both spam and not spam. After the machine learning model is generated, the policy pipeline 202 pushes the machine learning model to the inference pipelines 206a-c, where it is used to predict whether one or more emails, e.g., provided as input/inference data 210, are spam.

Thus, as depicted in FIG. 2A, a policy pipeline 202, a training pipeline 204 and inference pipelines 206a-c are depicted in an edge/center graph. In the depicted embodiment, new machine learning models are periodically trained in a batch training pipeline 204, which may execute on a large clustered analytic engine in a data center. As the training pipeline 204 generates new machine learning models, an administrator may be notified. The administrator may review the generated machine learning models, and if the administrator approves, the machine learning models are pushed to the inference pipelines 206a-c that comprise the logical pipeline grouping for the objective, each of which is executing on live data coming from an edge device, e.g., input/inference data 210.

Figure 2B:
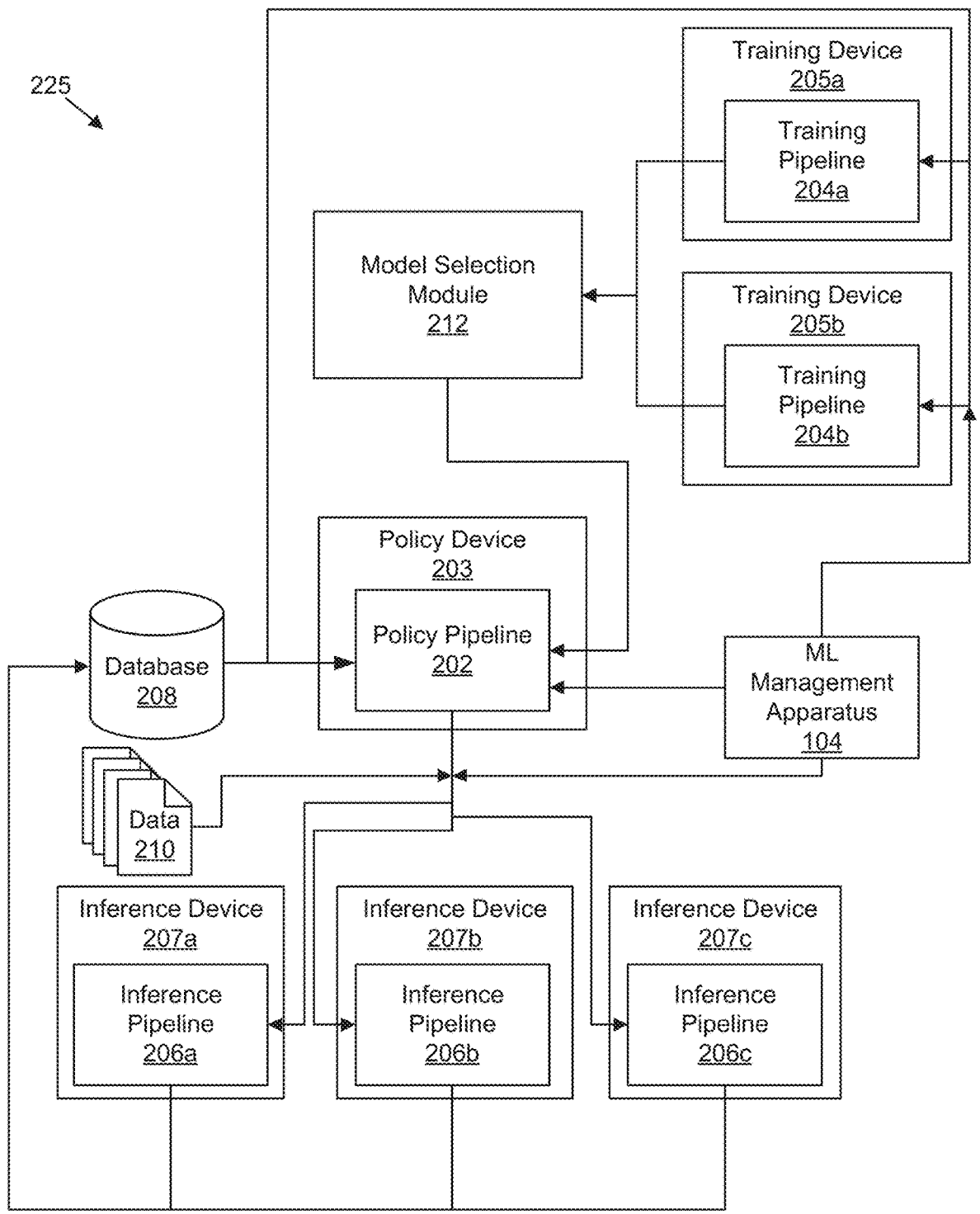
FIG. 2B is a schematic block diagram illustrating another embodiment of a logical machine learning layer for detecting suitability of machine learning models for datasets.

FIG. 2B is a schematic block diagram illustrating another embodiment of a logical machine learning layer 225 for detecting suitability of machine learning models for datasets. In one embodiment, the logical machine learning layer 225 of FIG. 2B is substantially similar to the logical machine learning layer 200 depicted in FIG. 2A. In addition to the elements of the logical machine learning layer 200 depicted in FIG. 2A, the logical machine learning layer 225 of FIG. 2B includes a plurality of training pipelines 204a-b, executing on training devices 205a-b.

In the depicted embodiment, the training pipelines 204a-b generate machine learning models for an objective, based on training data for the objective. The training data may be different for each of the training pipelines 204a-b. For instance, the training data for a first training pipeline 204a may include historical data for a predefined time period while the training data for a second training pipeline 204b may include historical data for a different predefined time period. Variations in training data may include different types of data, data collected at different time periods, different amounts of data, and/or the like.

In other embodiments, the training pipelines 204a-b may execute different training or learning algorithms on different or the same sets of training data. For instance, the first training pipeline 204a may implement a training algorithm TensorFlow using Python, while the second training pipeline 204b implements a different training algorithm in Spark using Java, and/or the like.

In one embodiment, the logical machine learning layer 225 includes a model selection module 212 that is configured to receive the machine learning models that the training pipelines 204a-b generate and determine which of the machine learning models is the best fit for the objective that is being analyzed. The best-fitting machine learning model may be the machine learning model that produced results most similar to the actual results for the training data (e.g., the most accurate machine learning model), the machine learning model that executes the fastest, the machine learning model that requires the least amount of configuration, and/or the like.

In one embodiment, the model selection module 212 performs a hyper-parameter search to determine which of the generated machine learning models is the best fit for the given objective. As used herein, a hyper-parameter search, optimization, or tuning is the problem of choosing a set of optimal hyper-parameters for a learning algorithm. In certain embodiments, the same kind of machine learning model can require different constraints, weights, or learning rates to generalize different data patterns. These measures may be called hyper-parameters, and may be tuned so that the model can optimally solve the machine learning problem. Hyper-parameter optimization finds a set of hyper-parameters that yields an optimal machine learning model that minimizes a predefined loss function on given independent data. In certain embodiments, the model selection module 212 combines different features of the different machine learning models to generate a single combined model. In one embodiment, the model selection module 212 pushes the selected machine learning model to the policy pipeline 202 for propagation to the inference pipelines 206a-c. In various embodiments, the model selection module 212 is part of, communicatively coupled to, operatively coupled to, and/or the like the ML management apparatus 104.

Figure 2C:
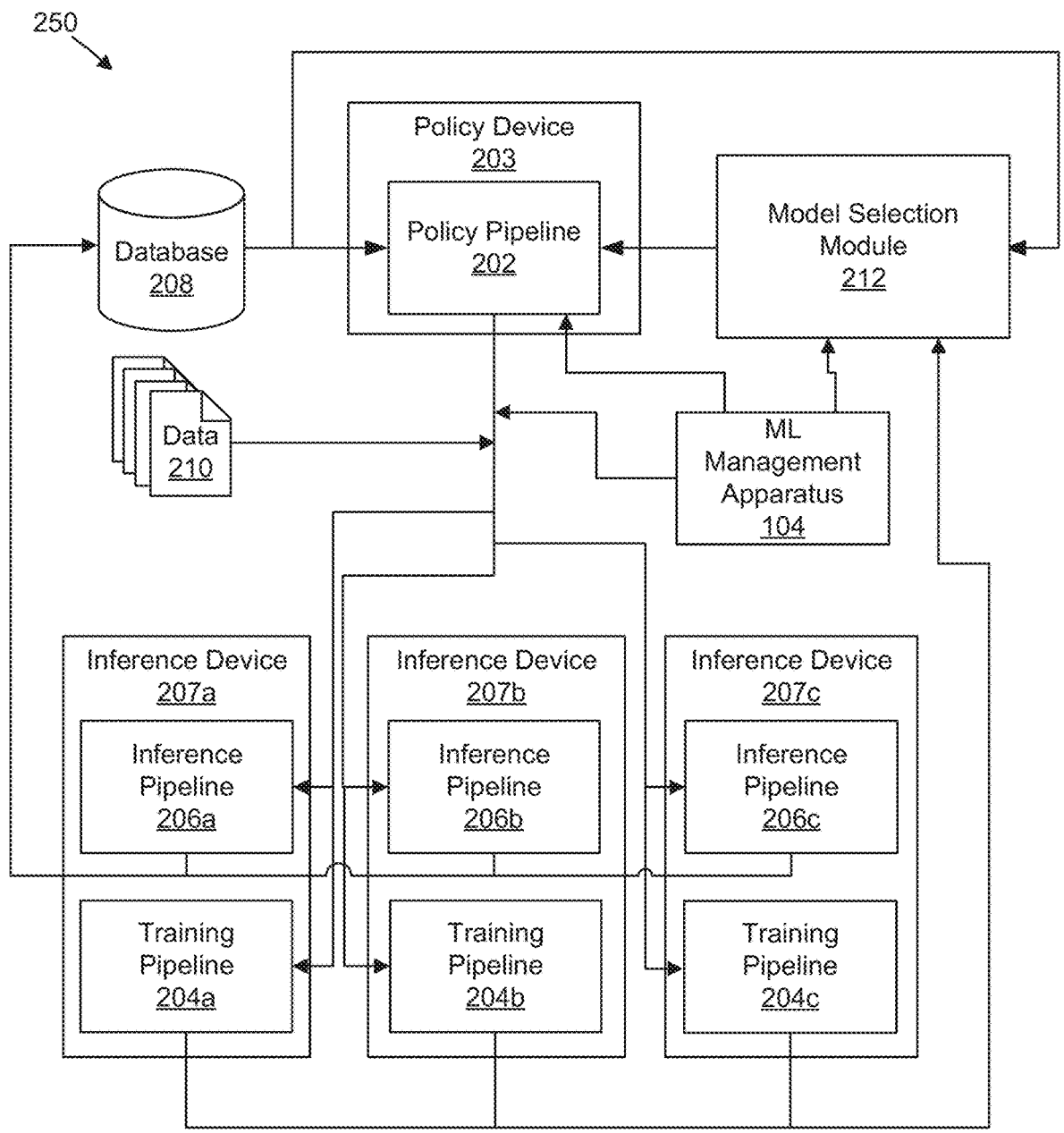
FIG. 2C is a schematic block diagram illustrating a certain embodiment of a logical machine learning layer for detecting suitability of machine learning models for datasets.

FIG. 2C is a schematic block diagram illustrating a certain embodiment of a logical machine learning layer 250 for detecting suitability of machine learning models for datasets. In one embodiment, the logical machine learning layer 250 of FIG. 2C is substantially similar to the logical machine learning layers 200, 225 depicted in FIGS. 2A and 2B, respectively. In further embodiments, FIG. 2C illustrates a federated learning embodiment of the logical machine learning layer 250.

In a federated machine learning system, in one embodiment, the training pipelines 204a-c are located on the same physical or virtual devices as the corresponding inference pipelines 206a-c. In such an embodiment, the training pipelines 204a-c generate different machine learning models and send the machine learning models to the model selection module 212, which determines which machine learning model is the best first for the logical machine learning layer 250, as described above, or combines/merges the different machine learning models, and/or the like. The selected machine learning model is pushed to the policy pipeline 202, for validation, verification, or the like, which then pushes it back to the inference pipelines 206a-c.

Figure 3:
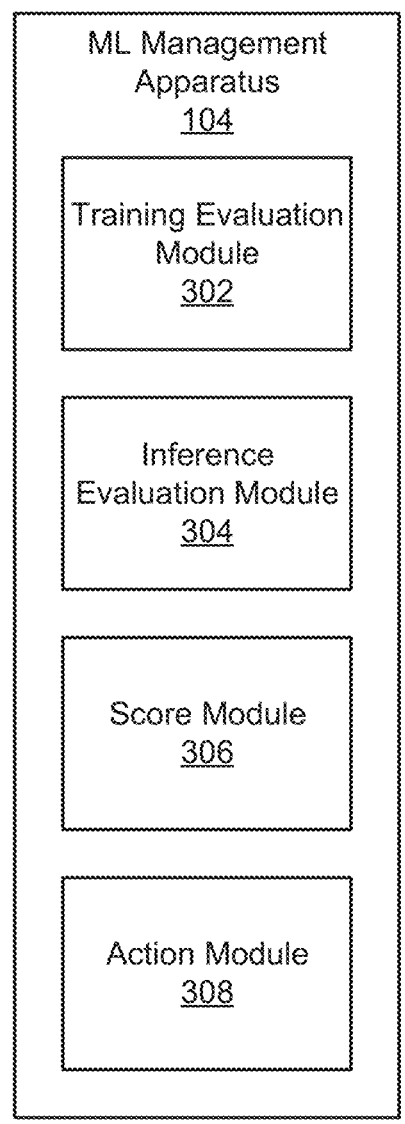
FIG. 3 is a schematic block diagram illustrating one embodiment of an apparatus for detecting suitability of machine learning models for datasets.

FIG. 3 is a schematic block diagram illustrating one embodiment of an apparatus 300 for detecting suitability of machine learning models for datasets. In one embodiment, the apparatus 300 includes an embodiment of an ML management apparatus 104. The ML management apparatus 104, in one embodiment, includes one or more of a training evaluation module 302, an inference evaluation module 304, a score module 306, and an action module 308, which are described in more detail below.

In one embodiment, the training evaluation module 302 is configured to calculate a first statistical data signature for a training data set of a machine learning system 200 using one or more predefined statistical algorithms. As explained above, the training data set may comprise a data set that is used to train a machine learning model for use in analyzing an inference data set at an inference pipeline 206. In certain embodiments, the training data set comprises data for one or more features. As used herein, features in machine learning comprise individual measurable properties or characteristics of a phenomenon being observed, and may be numeric, strings, graphs, and/or the like. For example, features within a data set may include age, sex, location, income, or the like. A training data set may include data for one feature or for multiple features.

In one embodiment, as used herein, the statistical data signature for the training data set may comprise a value, score, estimate, rank, or the like that describes the training data set relative to a different data set, e.g., an inference data set. The training evaluation module 302 may use various statistical algorithms to generate a statistical data signature for the training data set. For instance, as explained in more detail below, the training evaluation module 302 may use various statistical algorithms to determine the density/probability distribution of the training data set, of the data for a feature of the training data set, and/or the like such as a multinomial distribution algorithm, a Gaussian mixture model algorithm, a non-random forest of trees algorithm, and/or the like.

In one embodiment, the inference evaluation module 304 is configured to calculate a second statistical data signature for an inference data set of the machine learning system 200 using one or more predefined statistical algorithms. In certain embodiments, the one or more predefined statistical algorithms that the inference evaluation module 304 uses to generate the second statistical data signature are the same algorithms that are used to generate the first statistical data signature for the training data set, which allows the first and second data signatures to be compared relative to one another on the same basis.

For instance, if the training evaluation module 302 uses a Gaussian mixture model algorithm to generate the first statistical data signature for the training data set, the inference evaluation module 304 may use the Gaussian mixture model generated using the training data to generate the second statistical data signature for the inference data set. In this manner, the first and second statistical data signatures correspond to each other because they are generated based on the same statistical algorithm.

In one embodiment, the score module 306 is configured to calculate, determine, or the like a suitability score that describes the suitability of the training data set to the inference data set as a function of the first and second statistical data signatures. For instance, the suitability score may comprise a number, value, rank, threshold, unit, probability, estimate, and/or the like that indicates how suitable, e.g., how applicable or accurate a machine learning model trained using the training data set is for the inference data set, the degree with which the inference data set deviates from the training data set, and/or the like.

In one embodiment, the score module 306 may determine the suitability score as a function of the first and second statistical data signatures. For instance, the score module 306 may normalize the second statistical data signature as a function of the first statistical data signature so that the first and second statistical data signatures are normalized to a common scale. The score module 306 may perform various mathematical calculations on the first and second statistical data signatures to determine the suitability score such as average the scores, add/multiple/subtract/divide the scores, and/or other mathematical functions that derive a single value from a combination of two or more values.

In one embodiment, the score module 306 calculates the suitability score in real-time and on an ongoing basis during machine learning processing to determine the suitability of the training set data to the inference data set at a particular pipeline 202-206. For instance, the score module 306 may calculate the suitability score for an inference data set prior to analyzing the inference data set at an inference pipeline 206, during processing of the inference data set at an inference pipeline 206, after the inference data set has been processed at an inference pipeline 206, prior to the output from one inference pipeline 206 being input into a subsequent inference pipeline 206, and/or the like.

In certain embodiments, the training data set comprises continuous or categorical feature data. Continuous feature data, as used herein, is data that may have an infinite number of values, e.g., real numbers. Categorical feature data, as used herein, is data that may have discrete values, e.g., data that can only be a certain number of values. Different approaches may be used to evaluate the suitability of the training data set and machine learning model for the inference data set based on whether the data comprises continuous or categorical feature data, as explained below.

Univariate Data Deviation

In one embodiment, the score module 306 determines the suitability score on a per-feature basis using corresponding features of the training data set and the inference data set. In embodiments where the training data set comprises continuous and/or categorical feature values, and the suitability score is determined on a per-feature basis, the training evaluation module 302 determines a multinomial probability distribution over each feature of the training data set by assigning the values for each feature of the training data set to different bins/groups. The training evaluation module 302 then determines the probabilities for each of the bins/groups of the training data set, which indicates the likelihood of a values being in the training data set. For continuous feature data, the probabilities are equal to the ratio of number of samples that belong to each bin/group over the total number of samples in the training data set, and for categorical feature data the probabilities are equal to the ratio of the number of times each category appears over the total number of samples in the training data. The training evaluation module 302, in some embodiments, then calculates the average training probability score for the training data set as a function of the probabilities for each of the groups for a feature, which may comprise the data signature for the training data set.

In further embodiments, where the inference data set comprises continuous and/or categorical feature values, the inference evaluation module 304 determines a multinomial probability distribution over each feature of the inference data set by assigning the values for each feature of the inference data set to different bins/groups that correspond to the bins/groups of the training data set. The inference evaluation module 302 then determines the probabilities for each of the bins/groups of the inference data set, which indicates the likelihood of a values being in the inference data set being in the training data set. For continuous feature data, the probabilities are equal to the ratio of number of samples that belong to each bin/group over the total number of samples in the inference data set, and for categorical feature data the probabilities are equal to the ratio of the number of times each category appears over the total number of samples in the inference data. The inference evaluation module 302, in some embodiments, then calculates the average inference probability score for the inference data set as a function of the probabilities for each of the groups for a feature, which may comprise the data signature for the inference data set.

The score module 306 may then calculate the suitability score by normalizing the average inference probability score as a function of the average training probability score such that the probability scores are comparable on a common scale. A suitability score that satisfies (is equal to or greater than) a suitability threshold indicates that the training data set and the machine learning model trained with the training data set are suitable, accurate, or the like for the inference data set. Otherwise, the training data set may be unsuitable for the inference data set, and the action module 308 may perform one or more of the actions described below to improve the health or accuracy of the machine learning system 200.

Thus, even before the inference pipeline 206 analyzes the inference data set, and without the use of any labels generated using the inference data set, the ML management apparatus 104 can determine the suitability of the training data set and/or the machine learning model for the inference data set.

Multivariate Data Deviation Continuous Feature Data

In one embodiment, the score module 306 calculates the suitability score across a plurality of features of the training data set and the inference data set. In embodiments where the training data set comprises continuous feature data, the training evaluation module 302 may generate a Gaussian mixture model as a function of the training data set. As used herein, a mixture model comprises a probabilistic model for representing the presence of subpopulations within an overall population, without requiring that an observed data set should identify the sub-population to which an individual observation belongs. A Gaussian mixture model (also a multivariate Gaussian mixture model, a categorical mixture model, or the like) is one example of a mixture model that assumes all the data points are generated from a mixture of a finite number of Gaussian distributions with unknown parameters, and has the flexibility to model various types of density distributions.

In one embodiment, the training evaluation module 302 determines the likelihood distribution (e.g., the probability density function) of the training data as a Gaussian mixture model. A Gaussian mixture model, in various embodiments, consists of components, where each component has a Gaussian distribution. The training evaluation module 302, in certain embodiments, determines the optimal number of components to model the likelihood distribution using Bayesian Information Criteria ("BIC").

The likelihood equation for a Gaussian mixture model is given by the following equation:

$$p(X|\theta) = \sum_{k=1}^{K} w_k f(X|\mu_k, \Sigma_k)$$

Where $\theta = [w, \mu, \Sigma]$ are the parameters of the Gaussian mixture model. Let the number of components in the model be K, then $w=[w_1, w_2, \ldots, w_K]$, $\mu=[\mu_1, \mu_2, \ldots, \mu_K]$ and $\Sigma=[\Sigma_1, \Sigma_2, \ldots, \Sigma_K]$ represent the weights, mean, and covariance values, respectively, that correspond to each component. The subscript represents the components to which these values belong.

In one embodiment, the training evaluation model 302 determines the parameters of the Gaussian mixture model based on the training data set, or a subset(s) of the training data set. In further embodiments, the training evaluation module 302 determines a likelihood distribution of the training data set based on the generated Gaussian mixture model, and calculates an average training likelihood score based on the likelihood distribution of the training data set, which may comprise the data signature for the training data set. In certain embodiments, the likelihood calculated with a Gaussian mixture model does not have a fixed range (e.g., the likelihood value comprises a positive value that is not limited to values between 0 and 1), and therefore the average likelihood can be calculated during training.

In one embodiment, the inference data set also comprises continuous feature data, and the inference evaluation module 304 determines a likelihood distribution of the inference data set based on the Gaussian mixture model that the training evaluation module 302 generates using the continuous feature data of the training data set. In some embodiments, the inference evaluation module 304 calculates the likelihood over a batch of samples (e.g., in a batch mode) and/or over a window of samples (e.g., in a data streaming mode). The likelihood can vary over a wide range depending on the nature and dimensionality of the inference data set. Therefore, in certain embodiments, the inference evaluation module 304 calculates an average inference likelihood score based on the likelihood distribution of the inference data set, which may comprise the data signature for the inference data set.

The score module 306 may then calculate the suitability score by normalizing the average inference likelihood score as a function of the average training likelihood score such that the likelihood scores are comparable on a common scale, such as a scale from 0 to 1, 0 to 100, or the like. In one embodiment, if the range is set from 0 to 1, the upper limit of 1 may correspond to the average likelihood seen during training. If the lower limit is set to a value close to 0, this may indicate that a drop in likelihood relative to the average value seen during training is tolerable.

A suitability score that satisfies (is equal to or greater than) a suitability threshold indicates that the training data set and the machine learning model trained with the training data set are suitable, accurate, or the like for the inference data set. Otherwise, the training data set may be unsuitable for the inference data set, and the action module 308 may perform one or more of the actions described below to improve the health or accuracy of the machine learning system 200.

Multivariate Data Deviation—Categorical Binary Feature Data

In one embodiment, the score module 306 calculates the suitability score across a plurality of features of the training data set and the inference data set. In embodiments where the training data set comprises categorical/binary feature data, the training evaluation module 302 may determine a multinomial distribution that models a join distribution. For example, the following distribution represents a data set that contains three binary features:

(0,0,0)→0.3 (0,1,1)→0.2 (1,1,0)→0.1
(0,0,1)→0.05 (1,0,0)→0.1 (1,1,1)→0.1
(0,1,0)→0.05 (1,0,1)→0.1

The above data set, in one embodiment, is an example of a multinomial distribution where a probability value is assigned to each possible combination in the data set. In certain embodiments, the probability value is calculated as the ratio that each combination is present in the data set. However, when there are N features and k categories in each feature, the number of combinations is $N^k$. Note that each of the possible combinations may not be present in the training data set because the training data set itself might be $<N^k$. In one embodiment, a zero probability is not assigned to combinations that are not present in the training data set because a zero probability may imply that a zero probability is assigned to any new sample that is not a subset of the training data set. To prevent this issue, the training evaluation module 302 approximates the joint distribution of the categorical features as:

$$p(X_1,X_2, \ldots, X_N) = p(X_1,X_2)p(X_3,X_4,X_5) \ldots p(X_{N-1},X_N) = p(X_1)p(X_2|X_1)p(X_3)p(X_4|X_3)p(X_5|X_3,X_4) \ldots p(X_{N-1})p(X_{N-1}|X_N)$$

Note that the relationship between certain subsets of features is dropped. For the example training data set above, the result would be:

$$p(1,2,3) = p(1,2)p(3)$$

$$p(1,2) \rightarrow (0,0), (0,1), (1,0), (1,1)$$

$$p(3) \rightarrow (0), (1)$$

where $p(1,2)$ is modeled as $p(1,2) = p(1)*p(2|1)$

In one embodiment, this is modeled as a forest of trees. As used herein, each tree is a special data structure, where the number of children at each node is equal to the number of categories in a given feature. There are several such trees containing disjoint subsets of the feature set. A collection of these trees is referred to as a forest herein. The number of trees may be equal to the number of independent components, where each component is comprised of one or more features. The number of levels in each tree may be equal to the number of features it explains. The training evaluation module 302, in one embodiment, does not know ahead of time how many levels the tree is going to have or how many trees in total it will have. The training evaluation module 302 may start growing a tree and stop growing it whenever the training evaluation module 302 encounters a node with zero probability. If a node has zero probability, the training evaluation module 302 cuts the whole tree at the previous level (this node will not have any siblings). This means that either feature N is a part of the tree, or is not a part of it. All sibling/cousin nodes at a level may all have the exact same number of children.

For example, given the following:

$$p(X_3,X_4,X_5) = p(X_3)p(X_4|X_3)p(X_5|X_3,X_4)$$

The forest of trees may look like:

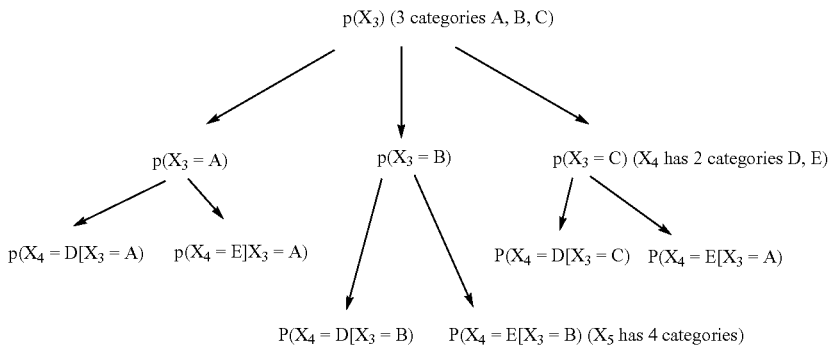

In order to determine when to grow and terminate a tree, for example, let there be K features. The training evaluation module 302 starts with any arbitrary feature, e.g., "5". Let "5" have (number of categories within it [1, 2, . . . ,Z]. The training evaluation module 302 may start by constructing a tree with Z child nodes, and assign a probability values to each of the child nodes. The probability value assigned to each node may be equal to the fraction of times the category appears in the training data set, looking at only the instant feature while ignoring other features. The training module 302 may pick another feature, e.g., "10", and detects the total number of categories in "10"(e.g., Y). The training module 302 may visit each child node and look at the subset of samples that belong to category [1, 2, . . . ,Z] respectively for feature "5", and model the probability distribution of all the categories (Y) in "10" given that feature "5" has categories "1", "2", . . . "Z", respectively. This results in Y number of child nodes for each node at this level.

In a case where the training evaluation module 302 is unable to find all the possible categories at a child node, it may imply that the training evaluation module 302 never saw such a combination in the training data set, and therefore terminates the tree at the previous level. In the above example illustration, if $X_5$ has 4 categories, (F,G,H,I), and if $P(X_5=G|X3=B, X4=E)=0$, it may indicate that the training evaluation module 302 never saw a combination (B,E,G) for the features (3,4,5). Therefore, the training evaluation module 302 terminates the previous level and the graph ends up looking like the illustrated tree above. The training evaluation module 302 may then start with a new tree and a new feature, possibly feature X5.

Thus, the training evaluation module 302 may be configured to generate a non-random forest of trees as a function of the training data set, determine a probability distribution of the training data set based on the generated non-random forest of trees, and calculate an average training probability score (e.g., the statistical data signature for the training data set) based on the probability distribution of the training data set.

In further embodiments, the inference module 304 is configured to determine a probability distribution of the inference data set based on the non-random forest of trees that is generated using the training data set. For instance, the inference module 304 may traverse the non-random forest of trees for each feature in the inference data set to determine the probability distribution of the features in the inference data set based on the probability distribution of the training data set. The inference module 304 may then calculate an average inference probability score (e.g., the statistical data signature for the inference data set) based on the probability distribution of the inference data set.

In certain embodiments, the score module 306 calculates the suitability score by normalizing the average inference probability score as a function of the average training probability score such that the probability scores are comparable on a common scale. A suitability score that satisfies (is equal to or greater than) a suitability threshold indicates that the training data set and the machine learning model trained with the training data set are suitable, accurate, or the like for the inference data set. Otherwise, the training data set may be unsuitable for the inference data set, and the action module 308 may perform one or more of the actions described below to improve the health or accuracy of the machine learning system 200.

Deep Learning Machine Learning Systems

In one embodiment, the machine learning system 200 comprises a deep learning machine learning system. As used herein, a deep learning system may be a class of machine learning algorithms that use a cascade of multiple layers of nonlinear processing units for feature extraction and transformation where each successive layer uses the output from the previous layer as input; learn in supervised (e.g., classification) and/or unsupervised (e.g., pattern analysis) manners; and learn multiple levels of representations that correspond to different levels of abstraction where the levels form a hierarchy of concepts. Examples of deep learning systems may include artificial neural networks, deep neural networks, and/or the like.

In certain embodiments, deep learning machine learning systems differ from other machine learning systems in that there are typically a larger number of model parameters and the transformations on features cascade on top of each other creating a complex non-linear transformation. In addition, deep learning deals with high dimensional inputs, such as images and time series data, e.g., text, by creating sparse connections between different layers in the network, which still results in a model with a large number of parameters. Being able to deal with high dimensional data such as images, and generate accurate predictive performance is an advantage of deep learning. However, extraction of a statistical signature from the feature space itself in such cases may be meaningless. One way to circumvent these issues is to compare the internal feature activations during training and inference.

Thus, in one embodiment, the inference data set comprises a data set that is the output from a learning layer of the deep learning system. In one embodiment, the inference data set comprises a data set that is output from a layer of the deep learning system that occurs prior to the final learning layer. For instance, the inference data set may comprise an output data set from the first learning layer of the deep learning system, from one or more intermediate learning layers, from the penultimate learning layer, and/or the like. Using the various statistical algorithms described above, the ML management apparatus 104 can determine whether the machine learning model being used in the deep learning system is suitable for various outputs generated by the deep learning system, without the use of labels, based on the statistical data signatures of the training data set and the inference data set.

In one embodiment, the action module 308 is configured to perform an action related to the machine learning system 200 in response to the suitability score satisfying (is equal to or less than) an unsuitability threshold, or in response to the suitability score not satisfying (e.g., is not equal to or greater than) a suitability threshold, which may be the same value as the unsuitability threshold. For example, the score module 306 may calculate a suitability score of 0.75 (or 0.25 unsuitability score) on a scale of 0 to 1, and if the unsuitability threshold is 0.3, or if the suitability threshold is 0.7, then the action module 308 may determine that the training data set, and by extension the machine learning model, is suitable for the particular inference data set.

On the other hand, if the suitability score is 0.6 (or 0.4 unsuitability score), and if the unsuitability threshold is 0.3, or if the suitability threshold is 0.7, then the action module 308 may determine that the training data set, and by extension the machine learning model, is not suitable for the particular inference data set. In such an embodiment, the action module 308 performs, triggers performance of, recommends, or the like an action related to the machine learning system 200.

For instance, the action module 308 may change, trigger changing, or recommend changing the machine learning model currently being used by an inference pipeline 206 to analyze the inference data set to a different machine learning model that was trained using a training data set that may be more suitable for the inference data set than the original training data set used to train the machine learning model.

In further embodiments, the action module 308 may retrain, trigger retraining, or recommend retraining the machine learning model using a different training data set that may more suitable for the inference data set than the training data set used to train the current machine learning model in response to the suitability score not satisfying a suitability threshold. In various embodiments, the action module 308 generates one or more labels, described below, as part of the output of the inference pipeline 206, which may be checked against the training data set to confirm the accuracy of the machine learning model.

In some embodiments, the action module 308 sends an alert, message, notification, or the like (e.g., to an administrator or other user) that indicates that the training data set and machine learning model that was trained using the training data set is unsuitable for the inference data set in response to the suitability score not satisfying a suitability threshold. In such an embodiment, the action module 308 may include additional information in the notification such as the suitability score, the training data set identifier, the inference data set identifier, the inference pipeline 206 identifier, the machine learning model identifier, one or more recommendations for increasing the suitability score (e.g., retrain the machine learning model with different training data, swap the current machine learning model with a different machine learning model, or the like).

In one embodiment, the action module 308 generates, triggers generation of, and/or recommends generation of one or more labels for the features of the inference data set in response to the suitability score satisfying the suitability threshold for the training and inference data sets. As described above, the labels may comprise the predictions, recommendations, forecasts, estimates, and/or the like that the machine learning system 200 outputs.

Figure 4:
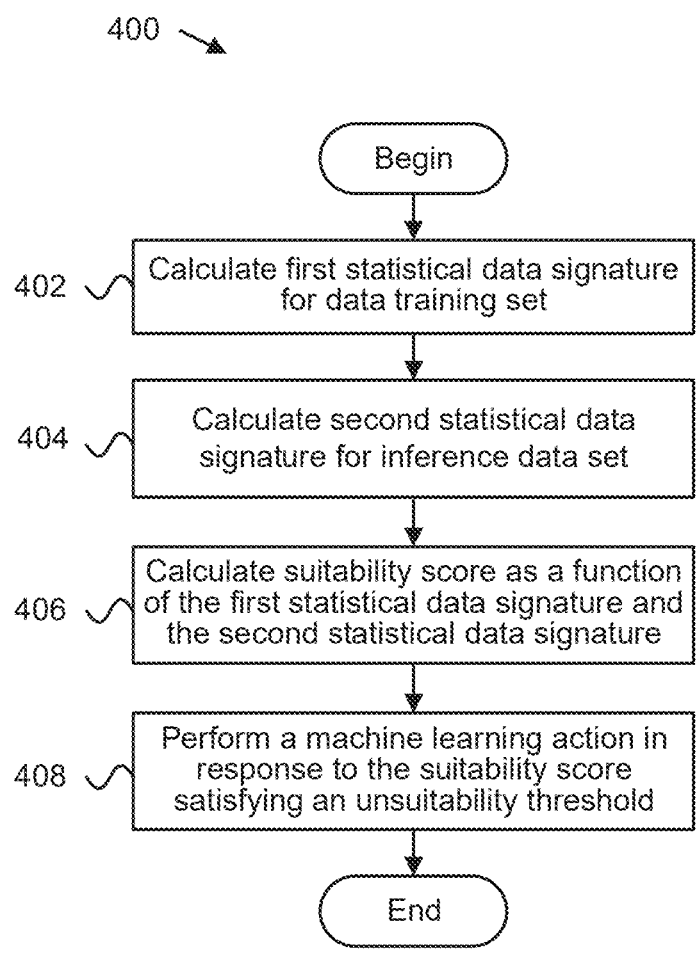
FIG. 4 is a schematic flow chart diagram illustrating one embodiment of a method for detecting suitability of machine learning models for datasets.

FIG. 4 is a schematic flow chart diagram illustrating one embodiment of a method 400 for detecting suitability of machine learning models for datasets. In one embodiment, the method 400 begins, and the training evaluation module 302 calculates 402 a first statistical data signature for a training data set of a machine learning system 200 using one or more predefined statistical algorithms. In some embodiments, the training data set is used to generate a machine learning model for analyzing an inference data set.

In further embodiments, the inference evaluation module 304 calculates 404 a second statistical data signature for an inference data set of the machine learning system using the one or more predefined statistical algorithms. In various embodiments, the score module 306 calculates 406 a suitability score describing the suitability of the training data set to the inference data set as a function of the first and the second statistical data signatures. In certain embodiments, the action module 308 performs 408 an action related to the machine learning system in response to the suitability score satisfying an unsuitability threshold, and the method 400 ends.

Figure 5:
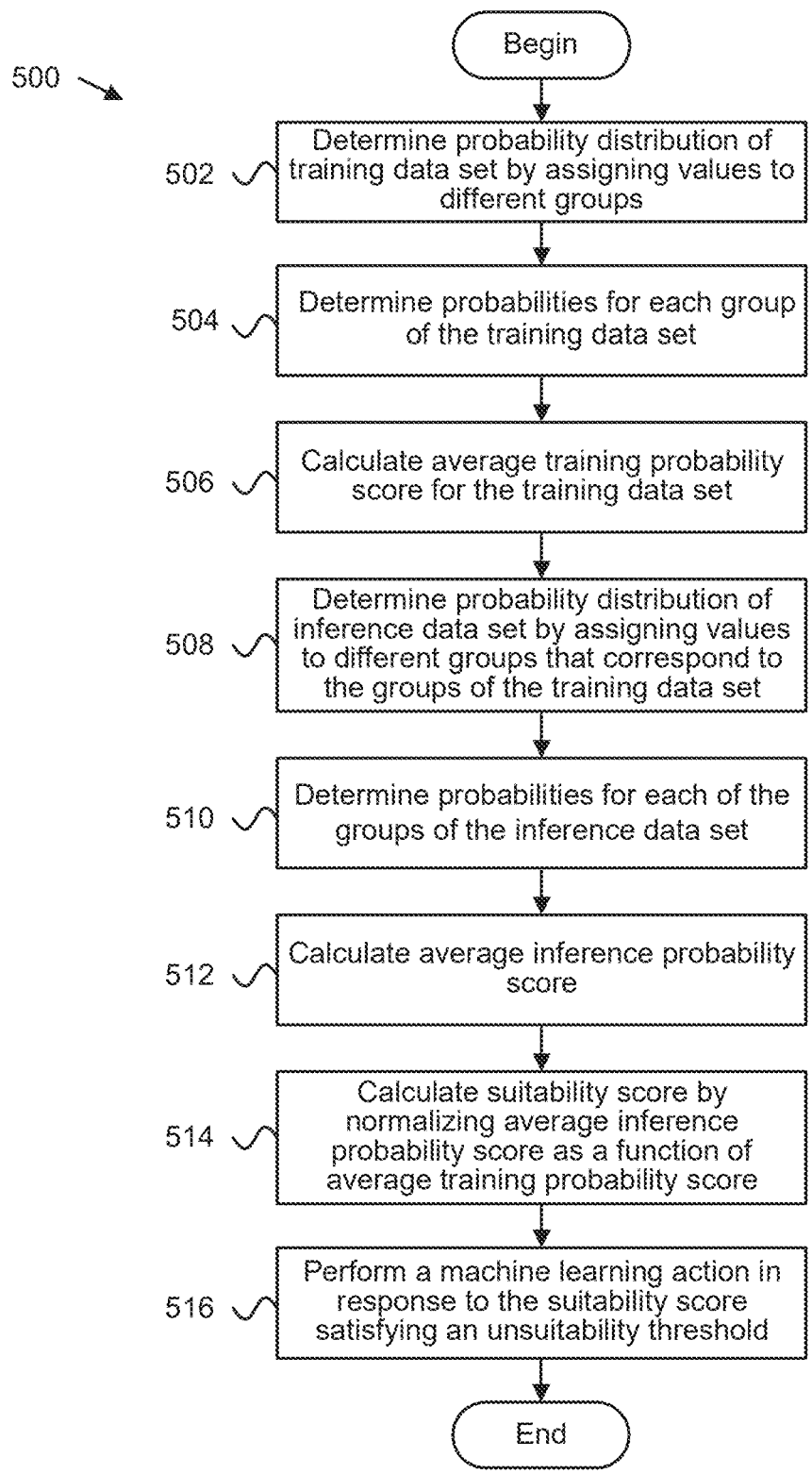
FIG. 5 is a schematic flow chart diagram illustrating another embodiment of a method for detecting suitability of machine learning models for datasets.

FIG. 5 is a schematic flow chart diagram illustrating another embodiment of a method 500 for detecting suitability of machine learning models for datasets. In one embodiment, the method 500 begins, and the training evaluation module 302 determines 502 a probability distribution of the training data set by assigning the values for a feature of the training data set to different groups, determines 504 probabilities for each of the groups of the training data set where the probabilities indicate a likelihood of a value being in the training data set, and calculates 506 an average training probability score for the training data set as a function of the probabilities for the groups.

In certain embodiments, the inference evaluation module 304 determines 508 a probability distribution of the inference data set by assigning the values for a feature of the training data set to different groups that correspond to the groups of the training data set, determines 510 probabilities for each of the groups of the inference data set where the probabilities indicate a likelihood of a value of the inference data set being in the training data set, and calculates 512 an average inference probability score based on the probability distribution of the inference data set.

In one embodiment, the score module 306 calculates 514 the suitability score by normalizing the average inference probability score as a function of the average training probability score. In various embodiments, the action module 308 performs 516 an action related to the machine learning system in response to the suitability score satisfying an unsuitability threshold, and the method 500 ends.

Figure 6:
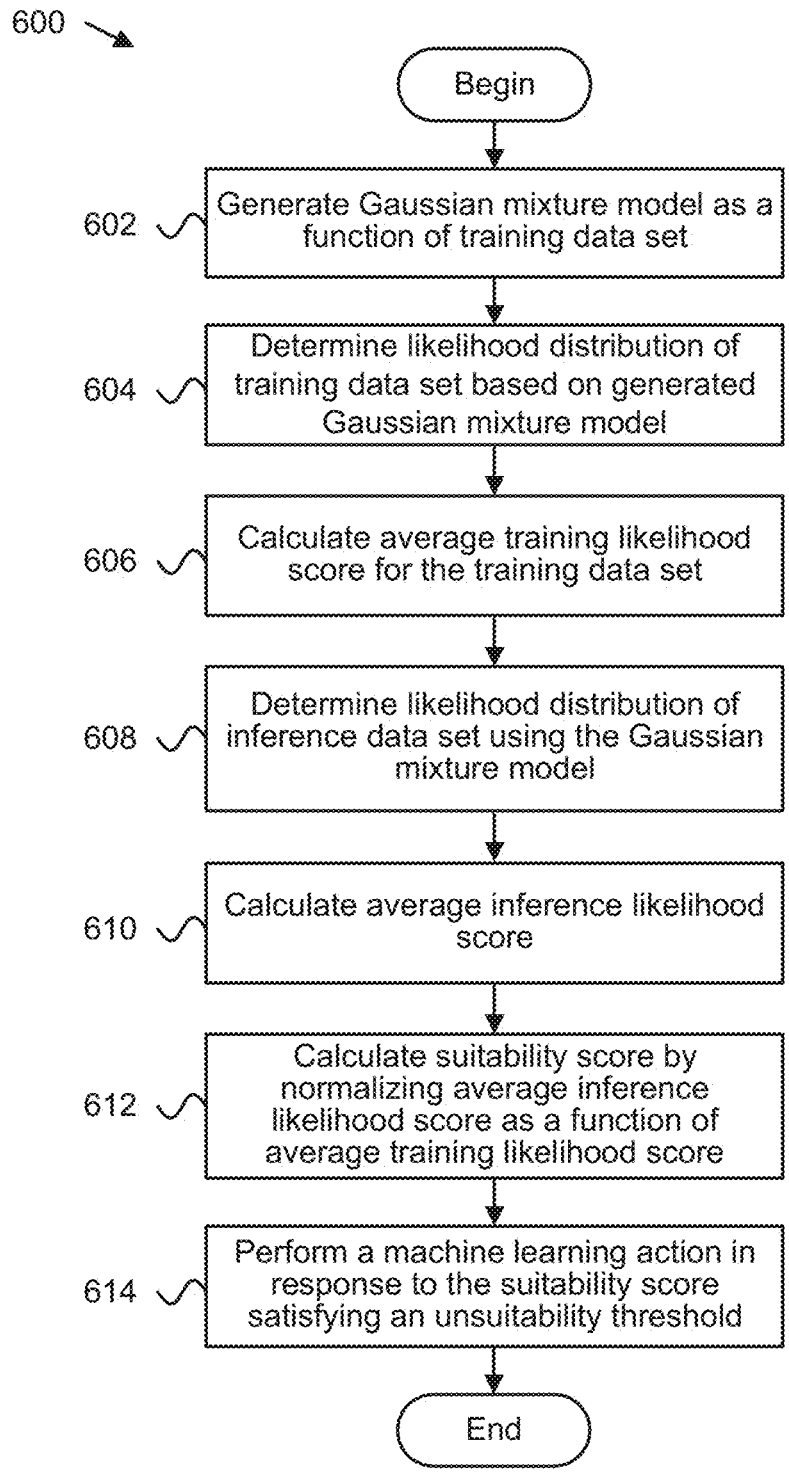
FIG. 6 is a schematic flow chart diagram illustrating another embodiment of a method for detecting suitability of machine learning models for datasets.

FIG. 6 is a schematic flow chart diagram illustrating another embodiment of a method 600 for detecting suitability of machine learning models for datasets. In one embodiment, the method 600 begins, and the training evaluation module 302 generates 602 a Gaussian mixture model as a function of the training data set, determines 604 a likelihood distribution of the training data set based on the generated Gaussian mixture model, and calculates 606 an average training likelihood score based on the likelihood distribution of the training data set.

In further embodiments, the inference evaluation module 304 determines 608 a likelihood distribution of the inference data set based on the generated Gaussian mixture model, and calculates 610 an average inference likelihood score based on the likelihood distribution of the inference data set. In certain embodiments, the score module 306 calculates 612 the suitability score by normalizing the average inference likelihood score as a function of the average training likelihood score, and the action module 308 performs 614 a machine learning action in response to the suitability score satisfying an unsuitability threshold, and the method 600 ends.

Figure 7:
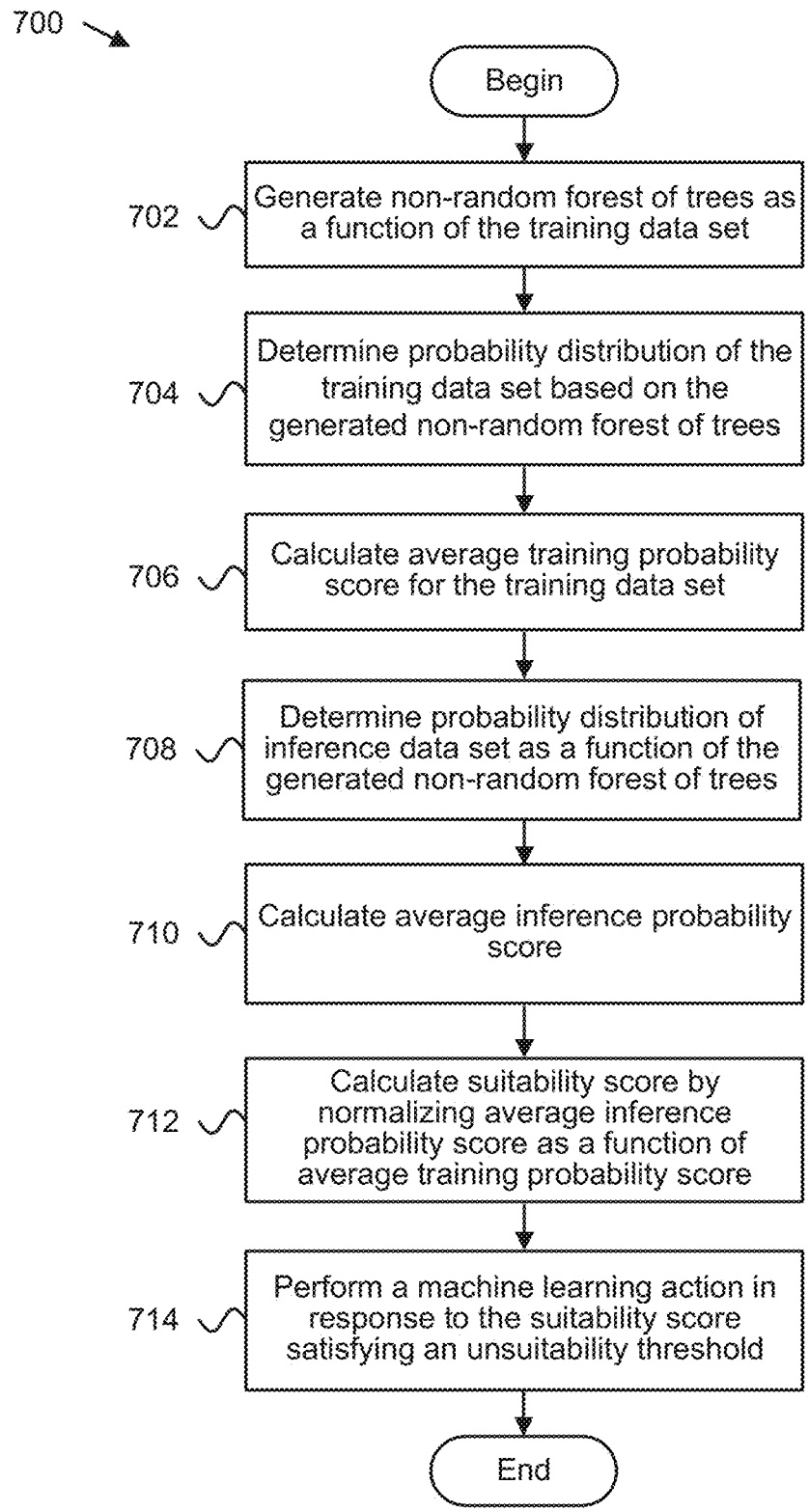
FIG. 7 is a schematic flow chart diagram illustrating another embodiment of a method for detecting suitability of machine learning models for datasets.

FIG. 7 is a schematic flow chart diagram illustrating another embodiment of a method 700 for detecting suitability of machine learning models for datasets. In one embodiment, the method 700 begins, and the training evaluation module 302 generates 702 a non-random forest of trees as a function of the training data set, determines 704 a probability distribution of the training data set based on the generated non-random forest of trees, and calculates 706 an average training probability score based on the probability distribution of the training data set.

In further embodiments, the inference evaluation module 304 determines 708 a probability distribution of the inference data set as a function of the non-random forest of trees generated based on the training data set (e.g., by traversing the non-random forest of trees to determine the probability associated with a given feature in the inference data set), and calculates 710 an average inference probability score based on the probability distribution of the inference data set. The score module 306, in certain embodiments, calculates 712 the suitability score by normalizing the average inference probability score as a function of the average training probability score, and the action module 308 performs 714 a machine learning action in response to the suitability score satisfying an unsuitability threshold, and the method 700 ends.

Means for calculating a first statistical data signature for a training data set of a machine learning system using one or more predefined statistical algorithms includes, in various embodiments, one or more of a ML management apparatus 104, a training evaluation module 302, a device driver, a controller executing on a host computing device, a processor, an FPGA, an ASIC, other logic hardware, and/or other executable code stored on a computer-readable storage medium. Other embodiments may include similar or equivalent means for calculating a first statistical data signature for a training data set of a machine learning system using one or more predefined statistical algorithms.

Means for calculating a second statistical data signature for an inference data set of the machine learning system using the one or more predefined statistical algorithms includes, in various embodiments, one or more of a ML management apparatus 104, an inference evaluation module 304, a device driver, a controller executing on a host computing device, a processor, an FPGA, an ASIC, other logic hardware, and/or other executable code stored on a computer-readable storage medium. Other embodiments may include similar or equivalent means for calculating a second statistical data signature for an inference data set of the machine learning system using the one or more predefined statistical algorithms.

Means for calculating a suitability score describing the suitability of the training data set to the inference data set as a function of the first and the second statistical data signatures includes, in various embodiments, one or more of a ML management apparatus 104, a score module 306, a device driver, a controller executing on a host computing device, a processor, an FPGA, an ASIC, other logic hardware, and/or other executable code stored on a computer-readable storage medium. Other embodiments may include similar or equivalent means for calculating a suitability score describing the suitability of the training data set to the inference data set as a function of the first and the second statistical data signatures.

Means for performing an action related to the machine learning system in response to the suitability score satisfying an unsuitability threshold includes, in various embodiments, one or more of a ML management apparatus 104, an action module 308, a device driver, a controller executing on a host computing device, a processor, an FPGA, an ASIC, other logic hardware, and/or other executable code stored on a computer-readable storage medium. Other embodiments may include similar or equivalent means for performing an action related to the machine learning system in response to the suitability score satisfying an unsuitability threshold.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
a memory device; and
one or more processors configured to execute instructions stored in the memory device to cause the system to perform operations including:
generating, by the one or more processors based on one or more statistical models, a first signature including a first score based on a distribution of values of one or more features of a training data set, the training data set provided as input to train a first model using machine learning;
generating, by the one or more processors based on the one or more statistical models, a second signature including a second score based on a distribution of values of one or more features of an inference data set, the inference data set provided as input to the first model trained based on the training data set using machine learning;
generating, by the one or more processors, a score indicating a suitability between the training data set and the inference data set based on the first score of the first signature and the second score of the second signature;
in response to a determination that the suitability score satisfies a threshold indicating unsuitability of the first model trained using the training data set for making predictions based on the inference data set, generating, by the one or more processors, a message an alert, message, or notification including an indication that the first model trained using the training data set is unsuitable for the inference data set and a recommendation regarding remedial action, and providing the message to a user via a computer network and/or a display device; and
in response to receiving user input indicating approval of the remedial action, replacing the first model with a second machine learning model,
wherein the distribution of values of the one or more features of the inference data set corresponds to a probability distribution of values of the one or more features of the inference data set.

2. The system of claim 1, wherein the operations further include generating the suitability score on an ongoing basis during processing using machine learning.

3. The system of claim 1, the suitability score indicating accuracy or predictive performance of the first model.

4. The system of claim 1, one or more of the training data set or the inference data set comprising feature data sets free of labels.

5. The system of claim 1, wherein the operations further include generating the first score before analyzing the inference data set.

6. The system of claim 1, the distribution of values of the one or more features of the training data set and the distribution of values of the one or more features of the inference data set each based on a data structure corresponding to a forest of trees.

7. The system of claim 1, wherein at least one feature of the one or more features of the training data set includes image data, string data, text data, or graph data, and at least one feature of the one or more features of the inference data set includes image data, string data, text data, or graph data.

8. The system of claim 1, wherein the first model comprises one or more learning layers of a deep learning system, the training data set comprises data output from a learning layer of the deep learning system preceding the one or more learning layers of the first model during training of the first model, and the inference data set comprises data output from the learning layer of the deep learning system during use of the first model.

9. The system of claim 1, wherein the remedial action comprises (i) retraining the first model on a second training data set, (ii) replacing the first model with the second machine learning model, or (iii) generating the second machine learning model.

10. The system of claim 9, wherein generating the second machine learning model comprises performing a hyperparameter search to choose values of one or more hyperparameters for a machine learning algorithm and training the second machine learning model using the machine learning algorithm.

11. The system of claim 1, wherein the remedial action comprises:
determining, based on a policy, that user approval is required to replace the first model with another machine learning model.

12. The system of claim 1, wherein the probability distribution of values of the one or more features of the inference data set is based on an assignment of the values of the one or more features of the inference data set to a plurality of bins.

13. A method comprising:
performing, by one or more processors, operations including:
generating, by the one or more processors based on one or more statistical models, a first signature including a first score based on a distribution of values of one or more features of a training data set, the training data set provided as input to train a first model using machine learning;
generating, by the one or more processors based on the one or more statistical models, a second signature including a second score based on a distribution of values of one or more features of an inference data set, the inference data set provided as input to the first model trained based on the training data set using machine learning;
generating by the one or more processors a score indicating a suitability between the training data set and the inference data set based on the first score of the first signature and the second score of the second signature;
in response to a determination that the suitability score satisfies a threshold indicating unsuitability of the first model trained using the training data set for making predictions based on the inference data set, generating by the one or more processors a message including an indication that the first model trained using the training data set is unsuitable for the inference data set and a recommendation regarding remedial action, and providing the message to a user via a computer network and/or a display device; and
in response to receiving user input indicating approval of the remedial action, replacing the first model with a second machine learning model,
wherein the distribution of values of the one or more features of the inference data set corresponds to a probability distribution of values of the one or more features of the inference data set.

14. The method of claim 13, further comprising: generating the suitability score on an ongoing basis during processing using machine learning.

15. The method of claim 13, the suitability score indicating accuracy or predictive performance of the first model.

16. The method of claim 13, one or more of the training data set or the inference data set comprising feature data sets free of labels.

17. The method of claim 13, further comprising: generating the first score before analyzing the inference data set.

18. The method of claim 13, the distribution of values of the one or more features of the training data set and the distribution of values of the one or more features of the inference data set each based on a data structure corresponding to a forest of trees.

19. The method of claim 13, wherein at least one feature of the one or more features of the training data set includes image data, string data, text data, or graph data, and at least one feature of the one or more features of the inference data set includes image data, string data, text data, or graph data.

20. The method of claim 13, wherein the first model comprises one or more learning layers of a deep learning system, the training data set comprises data output from a learning layer of the deep learning system preceding the one or more learning layers of the first model during training of the first model, and the inference data set comprises data output from the learning layer of the deep learning system during use of the first model.

21. The method of claim 13, wherein the remedial action comprises (i) retraining the first model on a second training data set, (ii) replacing the first model with the second machine learning model, or (iii) generating the second machine learning model.

22. The method of claim 21, wherein generating the second machine learning model comprises performing a hyper-parameter search to choose values of one or more hyper-parameters for a machine learning algorithm and training the second machine learning model using the machine learning algorithm.

23. The method of claim 13, wherein the remedial action comprises:
determining, based on a policy, that user approval is required to replace the model with another machine learning model.

24. The method of claim 13, wherein the probability distribution of values of the one or more features of the inference data set is based on an assignment of the values of the one or more features of the inference data set to a plurality of bins.

25. A non-transitory computer readable medium including one or more instructions stored thereon and executable by one or more processors to perform operations including:
generating, by the one or more processors and based on one or more statistical models, a first signature including a first score based on a distribution of values of one or more features of a training data set, the training data set provided as input to train a first model using machine learning;
generating, by the one or more processors and based on the one or more statistical models, a second signature including a second score based on a distribution of values of one or more features of an inference data set provided as input to the first model trained based on the training data set, the inference data set using machine learning;
generating, by the one or more processors, a score indicating a suitability between the training data set and the inference data set based on the first score of the first signature and the second score of the second signature; and
in response to a determination that the suitability score satisfies a threshold indicating unsuitability of the first model trained using the training data set for making predictions based on the inference data set, generating, by the one or more processors, a message including an indication that the first model trained using the training data set is unsuitable for the inference data set and a recommendation regarding remedial action, and providing the message to a user via a computer network and/or a display device; and
in response to receiving user input indicating approval of the remedial action, replacing the first model with a second machine learning model,
wherein the distribution of values of the one or more features of the inference data set corresponds to a probability distribution of values of the one or more features of the inference data set.

26. The non-transitory computer readable medium of claim 25, wherein the operations further include generating the suitability score on an ongoing basis during processing using machine learning.

* * * * *